United States Patent Office 3,323,921
Patented June 6, 1967

3,323,921
METHOD FOR PREPARING A CREAMING COMPOSITION FOR DAIRY PRODUCTS AND THE RESULTING PRODUCT
William K. Moseley, 631 E. 63rd St., Indianapolis, Ind. 46220; and Paul R. Elliker, 800 White Oak Drive, and William E. Sadine, 2115 N. 29th St., both of Corvallis, Oreg. 97330
No Drawing. Filed Aug. 17, 1964, Ser. No. 390,186
6 Claims. (Cl. 99—59)

This application is a continuation-in-part of application Ser. No. 348,777 filed Mar. 2, 1964, now abandoned.

This invention relates to novel additives for diary products. More particularly, it relates to novel creaming compositions for improving the flavor and stability of cottage cheese, cultured sour cream, buttermilk and the like.

At present, most dairy products such as cottage cheese, buttermilk and cultured sour cream, are prepared under conditions which favor spoilage and bacterial destruction of flavor components. For example, one modern method of manufacturing cottage cheese involves the separate steps of preparing cottage cheese curd, separating and washing the curd, and finally creaming the curd. Such a complex process obviously provides many opportunities for bacterial contamination, which is usually responsible for loss of flavor and spoilage of cottage cheese. Contaminating bacteria found frequently in spoiled cottage cheese, as well as in other dairy products, include various members of the genus Pseudomonas including *P. fragi* and *P. viscosa* and of the species *alicaligenes* including *A. metacaligenes*. These strains of bacteria can initiate the development of gelatinous or slimy curd defect in cottage cheese. In addition, they are known to cause the transformation of biacetyl, an important flavor component of most dairy products including cottage cheese, to acetoin. The above organisms, as well as other spoilage organisms, can be introduced into the process of preparing cottage cheese outlined above in a number of ways. In the first place, these organisms have been found in surge tanks, holding vats, pasteurized milk lines, cottage cheese vats, creaming mixture containers, water supplies, etc. Secondly, raw milk entering a dairy product plant is frequently contaminated with spoilage organisms. While these spoilage organisms can be eliminated by proper pasteurization, they are frequently reintroduced into the manufacture of cottage cheese or other dairy products at later stages of the manufacturing process.

One method of eliminating spoilage organisms from finished cottage cheese or other dairy products is a stepped-up sanitation program including the use of alkaline cleaners and chlorine solutions in cleaning equipment, lines, etc. Another sanitary precaution involves the chorination of the raw water supply for the cottage cheese plant. A third method of eliminating spoilage organisms involves the use of ordinary good sanitation plus careful pH control of the final product. For example, acidification of a cottage cheese inoculated with *P. viscosa* to pH=4.8 can retard spoilage caused by that organism whereas acidification to only pH=5.0 eventuates in a cottage cheese that spoils more rapidly with a slimy film within 74 hours at 15 degrees C.

In addition to the problem of preventing spoilage of cottage cheese or other dairy products, there is also the problem of rendering the particular dairy product more palatable. It has been found, that many spoilage organisms destroy biacetyl, one of the chief flavor ingredients in cottage cheese, buttermilk, etc., before actual spoilage is noticeable. For example, cottage cheese can become flat and tasteless by reason of having lost its original content of biacetyl by bacterial action without manifesting slimy curd defect. In attempting to solve the problem of biacetyl loss, a loss which is not important for but not peculiar to the manufacture of cottage cheese, Babel and Mather, in U.S. Patent 2,971,847, prepare a creaming mixture for cottage cheese by growing a citric acid fermenter such as *Leuconostoc citrovorum* in a sterile growth medium for 24–48 hours, then adding citric acid and fermenting the resulting mixture for another 24 hours. The growth media employed are usually milk products, thus making the final product directly suitable for creaming cottage cheese. *L. citrovorum*, as is well known, converts citric acid to biacetyl, and the creaming mixture of Babel and Mather thus contains a measurable quantity of biacetyl which in turn renders the cottage cheese creamed therewith more palatable.

The method for creaming cottage cheese proposed by Babel and Mather, since it provides for acidification of the cottage cheese and prevention of spoilage thereby, as well as for flavor enhancement, would seem to be an ideal solution to the problem of cottage cheese spoilage and of flavor loss and/or spoilage in other dairy products. Nevertheless, the method of Babel and Mather has certain defects. In the first place, those organisms which are the predominately citric acid fermenters and whose use is recommended by the authors, such as *Leuconostoc citrovorum*, grow in pure culture comparatively slowly in the laboratory. The same organisms are therefore naturally more subject to contamination especially when grown under the more primitive sterility conditions of a cottage cheese manufacturing plant since their slow growth makes them not too competitive against many common contaminating organisms. Secondly, the slow growth of the citric acid fermenters of Babel and Mather, requiring as it does from 48 to 72 hours to complete a full cycle, ties up fermentation equipment for such lengths of time as to render the whole process of only borderline commercial significance for many manufacturers of dairy products such as cottage cheese. Thirdly, the double fermentation cycle required by the Babel and Mather process, utilizing as it does a growth phase in milk medium followed by a growth phase in the same medium in the presence of added citric acid, is unnecessarily complex for a mass production industry. In addition, citric acid is a chemical additive and as such adds considerable expense to the process of making cottage cheese or other dairy products. Finally, Babel and Mather recommend an added homogenization step to provide a smooth creaming mixture for the cottage cheese and this step is another hindrance to the acceptance of the Babel-Mather process by many cottage cheese manufacturers.

It is an object of this invention to provide an additive for dairy products, particularly cottage cheese and buttermilk, which is economical to prepare, readily adapted for use in dairy product manufacturing plants which have fermentation equipment, and which provides dairy products of excellent keeping properties and superior taste.

In fulfillment of the above and other objects, this invention provides a method of preparing a flavor and stabilizing additive for dairy products, comprising incubating a substantially pure culture of a lactic acid bacterium in a milk substrate for periods of from 12 to 24 hours at a temperature in the range 20–22 degrees C., preferably at about 21 degrees C. The resulting culture can then be added to other milk materials to furnish the final flavor and stabilization additive.

These lactic acid producing bacteria are rapid growers and can be inoculated from dry or liquid seed directly into pasteurized or sterilized milk. This inoculum is incubated at relatively low temperatures for a period of from 12 to 24 hours. The resulting culture is in turn inoculated directly into the final bulk tank of culture milk or cream, incubation of which inoculated mixture for a period of from 12 to 24 hours, also at relatively low temperature, gives the final desired flavor additive, for example a creaming mixture additive, or creaming mixture base, for creaming cottage cheese curds, or adding to buttermilk or to butter.

A variation of this procedure, particularly useful in making cottage cheese since it shortens the process, involves inoculation of the creaming mixture with a culture derived from the first transfer from dry or liquid seed or from the succeeding bulk culture, followed by incubation of the inoculated culture for from 6 to 12 hours at 21 degrees C. The resulting cultured creaming mixture can be salted and added to the cottage cheese curd without homogenization.

In general, all the organisms which can be employed in our novel process to produce the novel flavor and stabilization additives of this invention are classed as lactic acid bacteria; i.e., they produce lactic acid during their growth cycle as a metabolic end product. The fact that we are able to employ lactic acid bacteria is quite surprising, since it has been the general opinion of those having skill in the art that the presence of lactic acid, and hence of lactic acid bacteria, was most undesirable in the production of cottage cheese or other dairy products. For example, Babel and Mather, in U.S. Patent 2,971,847, state that, in their process for producing a cottage cheese creaming mixture, "absence of lactic acid producing organisms such as *Streptococcus lactis* or *Streptococcus cremoris* is particularly important as excessive lactic acid is objectionable in creamed cottage cheese." Lundstedt in U.S. Patent 3,048,490 points out that milk starters containing *Streptococcus diacetilactic* usually produce gassy curd when added to milk according to conventional techniques and that such starters produce less curd and more undesirable curd particles without producing a better aroma in cottage cheese Yet, it is these same species of bacteria which the workers of the prior art found to be undesirable or to be used only under special circumstances that constitute the species most preferred in our novel process. In particular, certain strains of *S. diacetilactis* such as *S. diacetilactis* A.T.C.C. No. 15346 (*S. diacetilactis* 18–16) are preferred.

As previously stated, the lactic acid bacteria useful in our novel process are grown or incubated at relatively low temperatures, preferably at about 21 degrees C. although temperatures in the range 20 to 22 degrees C. are fully operative. It is important that the incubation temperature be kept below 22 degrees C. since, at higher temperatures, the bacteria produce undesirable large amounts of lactic acid and the amount of biacetyl present actually decreases, perhaps because of bacterial destruction.

The length of time required by our novel process to provide an adequate growth of a lactic acid Streptococcus such as *S. diacetilactis* can vary from 6 to 24 hours depending upon the growth characteristics of the strain of bacteria employed, the size of the inoculum, the culture medium employed, the temperature of incubation, etc. Actually, in many instances, an incubation period of from 6 to 12 hours will suffice. At any rate, the length of time is not critical, the critical factor being the attainment of a substantial growth of the lactic acid bacteria prior to using the incubated culture medium as a flavor and stabilizing additive.

Useful culture media which can be employed in our novel process include various milk-based substrates such as homogenized whole milk, skim milk, cream, etc.

The novel processes of this invention are more fully illustrated by the following specific examples:

*Example 1*

A pasteurized, homogenized sweet cream is cooled to about 21 degrees C. and then inoculated with the equivalent of a 0.5 to 1% active culture of *S. diacetilactis* A.T.C.C. No. 15346. The inoculated cream is incubated at about 21 degrees C. for about 6 hours. Salt is then added to taste and the resulting creaming mixture cooled with gentle agitation to about 2 degrees C. Cottage cheese curd is then creamed with the cooled creaming mixture.

*Example 2*

A portion of pasteurized non-fat milk is cooled to 21 degrees C. and inoculated with a culture of *S. diacetilactis* A.T.C.C. No. 15346 in sufficient amount to provide a luxurious growth after 16 hours of incubation at this temperature. The culture is then cooled to about 2 degrees C. and mixed with pasteurized, homogenized, salted sweet cream of approximately 20% fat content at the rate of 2 parts of non-fat culture to 3 parts of sweet cream. The resulting mixture is added directly to cottage cheese curd.

*Example 3*

The process of Example 2 is repeated except that pasteurized homogenized milk or creams of various fat contents are cultured with suitable strains of *S. diacetilactis* A.T.C.C. No. 15346 in place of the pasteurized non-fat milk of that example. The final culture is incorporated in creaming mixtures with desired final fat content.

One advantage of our novel process in the manufacture of cottage cheese is that the direct seed method of inoculation can be employed for producing our creaming mixture additive, thereby eliminating the necessity for cottage cheese manufacturing plants lacking facilities for propagating organisms to carry the culture over extended periods of time.

Cottage cheese creamed in the manner set forth above not only has superior aroma and taste because of the presence of appreciable amounts biacetyl, but also has a greatly extended shelf life over that of conventionally prepared cottage cheese. Both the persistence of biacetyl and lack of bacterial contamination apparently are due to the presence of large numbers of cells of the lactic acid bacteria, specifically *S. diacetilactis*, in the cottage cheese. The reason for the ability of *S. diacetilactis* to reduce contamination apparently is due in part to the ability of this rapidly growing lactic acid bacterium to competitively inhibit other bacteria in the milk substrate.

Compositions produced according to the process of this invention as exemplified in the above example are primarily useful for creaming cottage cheese. They are, however, also useful as flavor enhancing additives for cultured buttermilk, cultured sour cream, chemically soured cream, cream cheese, neufchatel cheese, margarine, butter, sour cream dips and the like. A *specific* example of the preparation of cultured buttermilk utilizing our novel additive and the process of preparing it follows:

*Example 4*

Pasteurized skim milk is cooled to about 72 degrees F. and inoculated with 0.5 to 1.0 percent of an active, mixed strain buttermilk culture. The resulting mixture is incubated according to the conventional procedure for the manufacture of buttermilk. Next, two grams of lyophilized seed culture of *S. diacetilactis* A.T.C.C. No. 15346 is added to 10 gallons of pasteurized skim milk and the resulting mixture is incubated, after thorough agitation, for six hours at 21° C. to 22° C. Following this incubation period, the direct seed culture is immediately cooled to below 5° C. Ten percent of the above chilled *S. diacetilactis* culture is added to the ripened buttermilk prepared as above using the mixed strain starter culture and cooled to below 5° C. The resulting mixture is agitated thoroughly and packaged in the usual manner. The resulting product has excellent flavor characteristics.

The above procedure has several advantages over prior art buttermilk manufacturing processes involving the use of citrated whey. In the first place, use of the direct seed procedure for preparing a *S. diacetilactis* culture eliminates the necessity of maintaining the organism in dairy plants. Secondly, the *S. diacetilactis* inoculum can be stored for as long at a week at 2° C. to 5° C., thus providing a readily available source of flavor additive for daily use.

Lastly, only skim milk, whole milk or cream culture of the flavor organism need be prepared, thus simplifying the manufacture of varied dairy products in the same plant.

The preparation of cultured sour cream is exemplified by the following example:

*Example 5*

Ten percent of a 6 hour *S. diacetilactis* culture prepared in pasteurized homogenized cream of the same fat content as used for the sour cream by the direct seed method as outlined in Example 1 is blended into sour cream just prior to packaging the product.

A higher viscosity in the *S. diacetilactis* seed culture can be achieved by acidification with food grade citric acid. The same advantages of stability and uniformity in flavor results for the cultured sour cream thus produced as are indicated above for cultured buttermilk.

The preparation of ripened cream butter is illustrated by the following example:

*Example 6*

Cream to be churned into butter is mixed with 5% of a 6-hour *S. diacetilactis* seed culture, prepared as described above. Alternatively, in order to provide greater flavor, the cream is inoculated with 1.0% of the *S. diacetilactis* culture and allowed to ripen for 6 hours at 72° F. prior to churning. A third alternative is to work a 6-hour culture of *S. diacetilactis* into the butter after the buttermilk has been drained.

In each of the above examples other strains of *S. diacetilactis* which have similar properties to *S. diacetilactis* A.T.C.C. No. 15346 may be used in place of that organism with substantially the same results.

The invention claimed is:

1. The method of preparing a flavoring and stabilizing creaming composition for dairy products which comprises incubating a substantially pure inoculum of a 0.5 to 1% active strain of *S. diacetilactis* bacterium in the range 20–22 degrees C. for a period of from 6 to 24 hours in a milk substrate to obtain a luxurious growth of said bacterium; and cooling said substrate to about 2° C.

2. The process of claim 1 in which *S. diacetilactis* A.T.C.C. No. 15346 is employed.

3. The process of claim 1 in which the incubation is carried out at about 21° C.

4. The method of claim 1 wherein said milk substrate is a pasteurized and homogenized creaming mixture, the temperature of said creaming mixture being adjusted to 20–22° C. prior to inoculation of said creaming mixture with said bacterium.

5. The method of claim 1 wherein said milk subtrate is non-fat pasteurized milk, the temperature of said substrate being adjusted to 20–22° C. prior to inoculation of said substrate with said bacterium, and wherein the fat content of said substrate is adjusted after said substrate is cooled by adding 3 parts of pasteurized, homogenized sweet cream to 2 parts of said substrate thereby producing a creaming mixture containing a luxurious growth of said bacterium.

6. A flavor enhancing and stabilizing creaming composition for dairy products prepared by culturing a substantially pure 0.5 to 1% active strain of a *S. diacetilactis* bacterium in the range 20–22 degrees C. for from 6 to 24 hours in a milk substrate, and cooling said substrate to about 2° C.

References Cited

UNITED STATES PATENTS

| | | | |
|---|---|---|---|
| 2,586,072 | 2/1952 | Marcoux | 99—59 |
| 3,048,490 | 8/1962 | Lundstedt | 99—116 |

OTHER REFERENCES

Journal of Dairy Science, vol. 45, July–Dec. 1962, pp. 1327–1331.

A. LOUIS MONACELL, *Primary Examiner.*

RAYMOND N. JONES, *Examiner.*

S. E. HEYMAN, *Assistant Examiner.*